(12) United States Patent
deSouza, Jr. et al.

(10) Patent No.: US 12,324,496 B2
(45) Date of Patent: Jun. 10, 2025

(54) ELECTRONIC DEVICE COVER AND SEAL ASSEMBLY

(71) Applicants: Jose Carlos Ferreira deSouza, Jr., La Canada, CA (US); Roberto Ferreira deSouza Miglioli, Piraju (BR)

(72) Inventors: Jose Carlos Ferreira deSouza, Jr., La Canada, CA (US); Roberto Ferreira deSouza Miglioli, Piraju (BR)

( * ) Notice: Subject to any disclaimer, the term of this patent is extended or adjusted under 35 U.S.C. 154(b) by 0 days.

(21) Appl. No.: 18/443,071

(22) Filed: Feb. 15, 2024

(65) Prior Publication Data

US 2024/0415255 A1    Dec. 19, 2024

Related U.S. Application Data

(60) Provisional application No. 63/485,637, filed on Feb. 17, 2023.

(51) Int. Cl.
| | | |
|---|---|---|
| *A45C 13/00* | (2006.01) | |
| *A45C 11/38* | (2006.01) | |
| *A45C 11/00* | (2006.01) | |

(52) U.S. Cl.
CPC ............ *A45C 13/008* (2013.01); *A45C 11/38* (2013.01); *A45C 11/002* (2025.01); *A45C 11/003* (2025.01)

(58) Field of Classification Search
CPC ..... A45C 13/008; A45C 13/002; A45C 11/38; A45C 11/002; A45C 11/003
USPC ............................................. 206/316.2, 316.1
See application file for complete search history.

(56) References Cited

U.S. PATENT DOCUMENTS

| | | | | |
|---|---|---|---|---|
| 2010/0147715 A1* | 6/2010 | Miglioli | ............... | A45C 13/008 206/316.2 |
| 2012/0262618 A1* | 10/2012 | Weakly | ................. | G06F 1/1632 348/E5.022 |
| 2024/0053121 A1* | 2/2024 | Searle | .................... | F41C 33/06 |

* cited by examiner

*Primary Examiner* — Jacob K Ackun
(74) *Attorney, Agent, or Firm* — Colin P. Abrahams

(57) ABSTRACT

A cover and seal assembly for an electronic device comprises a cover defining a space and having an opening therein with a peripheral edge through which the electronic device can be inserted or removed, and a seal assembly for sealing the opening. The seal has a base portion having a circular side wall with a top edge and bottom edge, an outer peripheral flange, an inner glass support shelf, a lens fastened to and supported on the inner glass support shelf, and a depending wall extending downwardly from the inner glass support shelf. A washer is mounted on the outer peripheral flange for capturing the peripheral edge of the cover. A nut connects to the circular side wall for maintaining the washer in a fixed position on the outer peripheral flange.

18 Claims, 17 Drawing Sheets

ELECTRONIC DEVICE COVER AND SEAL ASSEMBLY

CROSS REFERENCE TO RELATED APPLICATIONS

This application claims the benefit of United States Provisional Patent Application No. 63/485,637 filed Feb. 17, 2023, the contents of which are incorporated herein by reference in their entirety.

FIELD AND BACKGROUND

This invention relates to a cover and seal assembly for an electronic device. The cover and seal assembly of the invention may be used on a wide range of electronic devices, including cameras, smartphones, tablets and the like. However, the invention is not limited to such devices, and any object which requires a cover and seal assembly of the invention whereby a watertight and airtight housing cover with at least one opening and a sealing structure may benefit of the assembly of the invention.

Electronic devices such as cameras, camcorders, cell phones, audio/video hand-held players, laptops, and personal organizers are a fundamental part of everyday life. These increasingly portable electronic devices are used for several purposes, including scientific, professional and leisure purposes. These devices, however, are seldom, if ever, designed to withstand the hazardous environmental conditions in which they are often used. Moisture, dirt, dust, water, mud, sand, or other undesired environmental elements can damage them, render them inoperative, or prevent their use altogether. Even when such devices are designed to be "water resistant" or "waterproof", they would still benefit from the present invention, because they have moving parts and openings that do not necessarily protect from the outside elements or the water over time.

SUMMARY

The present invention presents a way to protect electronic equipment such as cameras, camcorders, portable radios, cellular phones, laptops, audio/video devices, accessories, etc. The invention uses a generally flexible and shaped bag which is waterproof, together with one or more connector mechanisms by means of which apertures and ports in the bag are sealed so that the interior of the bag is maintained in a water and air tight condition in order to protect the delicate electronic devices which are contained within the bag from moisture as well as dust or other potentially harmful material that may affect the operation and accuracy of the electronic device.

Devices do exist that are designed to withstand or resist hazardous environmental conditions. Some photo cameras, film cameras, portable radios, and audio devices are manufactured specifically for the aquatic environment. These are often developed with sealing systems or special customized chambers, but are also often heavier, bigger, and more expensive than conventional products or devices since they are customized for extreme use. For these reasons, many of these products have niche market penetration and are seldom adopted by a wide number of users. There are two ends of the spectrum. On one end are the inexpensive, unprofessional, awkward to use plastic bags that yield commensurate results. And on the other, there are hard-cases that are typically single purpose, matching to a camera (that is, not universal), often do not support all the device's functionality, and are heavy, bulky, and expensive.

In the specific case of cameras, smart phones and camcorders, there are also accessories that, when coupled to the conventional product, allow for their use in humid, wet, or completely submerged (under water) environments. These accessories are usually in the form of water tight chambers that are custom sized and shaped to work only with a single make and model of the particular camera or equipment. They are manufactured with bulky rigid materials or semi-rigid materials that significantly increase the overall volume and weight of the camera or equipment. This increased weight also means underwater equipment is seldom compatible with (or at least desirable for) amphibian or above-water use.

In one aspect of the invention, there is provided a cover and seal assembly for use on electronic devices which is versatile and of broad scope in application, in that a single cover may be used with multiple devices which may have different shapes and configurations. The assembly of the invention is therefore not intended, at least in one aspect thereof, to be configured to a specific device having particular dimensions and sizes, but offers flexibility of use in that it can accommodate devices of different types.

DETAILED DESCRIPTION

Reference is now made to the various illustrations showing different embodiments of the invention. Note that the invention may differ in detail between the embodiments shown and those related embodiments not shown, but which fall within the scope of the invention.

Reference is now made to FIGS. 1 to 4 of the drawings, which show the cover and seal assembly 10 in accordance with one aspect of the invention. In these figures, the exploded form of the assembly and the sequential fastening thereof to the cover is shown, so as to clearly highlight the structure of the seal assembly 10 and the manner in which it interacts with the cover portion.

Figure 1:
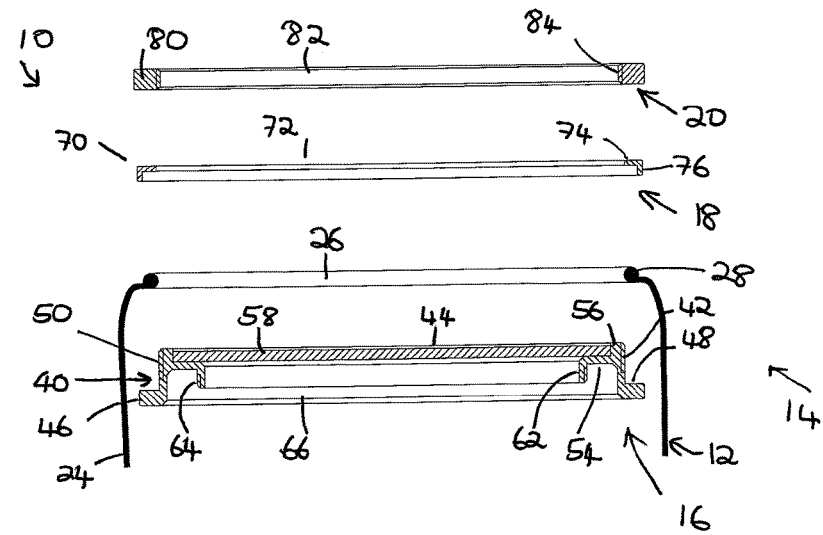
FIG. 1 is an exploded side view of a seal assembly for use with a cover of the invention, showing all components separated from each other.

FIG. 1 of the drawings shows an exploded view of the cover and seal assembly 10, including a part of the cover portion 12 and all of the components which make up the seal assembly 14. The seal assembly 14 comprises a base 16, a washer 18, and a nut 20. The cover portion 12, as will described, is sandwiched and squeezed at its opening edge between the base 16 and the washer 18 when the cover portion 12 is connected to the seal assembly 10.

The cover portion 12 is shown only in part in these FIGS. 1 to 4. It should be noted that the cover portion 12 may be part of a cover which is for a camera, or for a smart phone, or some other type of electronic device. The mechanism for the fastening connection between the components will, for the most part, be the same in each instance.

The cover portion 12 comprises a body portion 24 and a cover opening 26. In use, the cover opening 26 will be positioned so that it is adjacent or over the lens of the camera, and the cover portion 12 and the seal assembly 14 will provide substantially unimpeded outside access of light to the camera lens to clearly and fully capture images, either as if the cover and seal assembly 10 were not present, or has an effect so slight as to be almost negligible to the quality of a captured image. The construction may thus be designed to optimize optical integrity without significant interference. The cover portion 12 has an enlarged O-ring 28 adjacent the cover opening 26, in order to provide an improved and more effective structure capable of being more firmly captured and squeezed between the base 16 and the washer 18, in order to provide a seal unlikely to be compromised under normal or even more extreme operating conditions.

The base 16 comprises a body portion 40 having an outer side wall 42 which defines an open through space 44. The outer side wall 42 has a peripheral flange 46 which defines an O-ring shelf 48. The outer side wall 42 has a threaded portion 50 at least near its upper end. Further, there is a glass support shelf 54 extending into the through space 44 for a short distance. The upper end of the outer side wall 42 comprises glass framing projection 56. A glass or lens 58, or clear plastic or acrylic, rests on the glass support shelf 54 and its periphery is adjacent the glass framing portion 56, ensuring that the glass 44 remains firmly accommodated within this space provided. The glass 58 may be glued or otherwise attached to the glass support shelf 54 and/or the glass framing projection in order to form an airtight and watertight seal, and thereby prevent the glass 58 from falling out of or coming loose from its defined space. The glass 58 is formed to cover and seal the through space 44 and to preferably be of a size and dimension which will interfere minimally or not at all with light from the outside of the cover and seal assembly 10 so that image quality, intensity and form is not compromised by the presence of the assembly 10.

It will be seen that glass 58 is substantially flush with the upper end of the outer side wall 42, facilitating the run off of water or condensation on the glass 58, and reducing the possibility that any water droplets or condensation may interfere with the quality of the light image traveling through the base 16 and the various openings. Further, the glass 58 may be treated with surface materials that minimize or reduce the possibility of condensation, so as to once more preserve the integrity of the image which is captured by the camera.

At the inner end of the glass support shelf 54, there is formed a depending inner wall 62. The inner wall 62 has an outer surface which includes a lens thread 64. The inner wall 62 does not obstruct the light in the space it surrounds, and allows light to travel therethrough, and also through the base opening 66. Importantly, it should be noted that in accordance with one preferred aspect of the invention, the lower end of the inner wall 62 does not extend into or beyond the base opening 66 between the outer flange 46, and is in fact a distance within the space defined by body portion 40. The purpose of the inner wall 62 and the lens thread 64 is to provide a point of connection between the base 16 and the lens of a camera, where this may be available, depending upon the type of camera and lens which is being used. As is well known, many camera lenses have a threaded portion, usually on an inner rim, which may have multiple functions, such as for connecting to filters, for example, and the lens thread 64 on the inner wall 62 is able to attach to the threaded portion of such a lens. This attachment mechanism may provide not only support for the base 16, but would also help to ensure that the base 16 and its associated structures are properly aligned and held in position directly over the lens so the base 16 and the lens register or correspond with each other for optimal imaging and photographic effect, and reduce or eliminate interference. The position of the inner wall 62, being fairly close to the glass 58, also may help to keep the glass closer to the camera lens, as compared to the arrangement where the inner wall 62 projects outwardly from the body portion 40, thereby increasing the distance between the glass 58 and the lens. A closer location between the two may enhance picture quality.

The fact that the inner wall 62 is effectively contained within the space defined by the outer side wall 42 has certain important consequences. One further such consequence to that already mentioned may be that the glass 58 is nearer the camera lens in use, and keeps the seal assembly 14 and the cover portion 12 nearer the camera, and is thereby less likely to impede any peripheral light and image around the lens of the camera.

The washer 18 comprises a washer ring 70 defining a washer opening 72, and the washer opening 72 corresponds substantially in position to the base opening 66 and the through space 44. The washer 18 is generally of an L-shape, and has a washer ring top wall 74 and a washer ring side wall 76. This structure facilitates the proper engagement of the cover O-ring 28, since it is able to optimally squeeze and compress more effectively the O-ring, which is comprised of a compressible silicone material, and push the cover O-ring 28 more securely onto the O-ring shelf 48 of the base 16, as will be seen in subsequent figures. The structure is designed to optimize surface area and the positioning of the seal, while also preventing friction between the cover and the nut.

The nut 20 comprises a nut ring 80 defining a nut opening 82, also corresponding to, and generally axially aligned with, the cover opening 26, the washer opening 72, and the base opening 66. The nut ring 80 has on its inner surface a nut thread 84, which is adapted to engage and fasten on to the thread portion 50 of the base 16. This will also be seen in subsequent figures.

Figure 2:
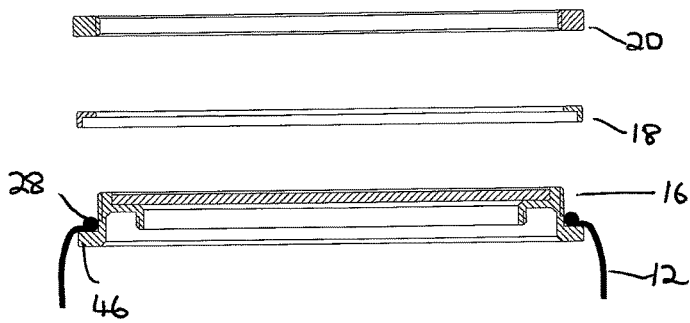
FIG. 2 is a partial exploded side view of a seal assembly for use with a cover of the invention, showing the base member and cover fastened to each other, and wherein all other components are separate from each other.

FIG. 2 of the drawings shows the first step in the sequence of connecting the cover portion 12 with the seal assembly 14. It will be seen that the cover O-ring 28 is placed on the outer flange 46, so as to rest against the O-ring shelf 48. The cover opening 26 is about the same size as, or just slightly smaller than the diameter of the outer side wall 42, and the cover portion 12 will therefore snugly engage with the body portion 40. Since the cover portion 12 is preferably comprised of a silicone rubber material (which may be soft, malleable, rubberized), or a material similar thereto, it can be stretched to some sufficient extent, and return to its rest position. As such, the cover O-ring 28 forms a solid fit and connection with the body portion 40, paving the way for the securing of the two of these components together in a watertight and airtight manner. Further benefits of the above also include the following characteristics: (1) it can give the user some tactile feedback of application efficacy; and (2) it will allow user-adjustable pressure control as part of that feedback when fitting the cover.

Figure 3:
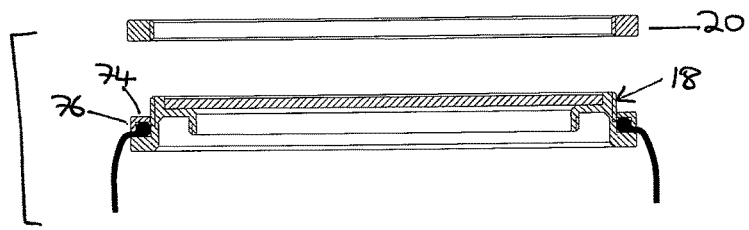
FIG. 3 is a partial exploded side view of a seal assembly for use with a cover of the invention, showing the base member and cover and washer fastened to each other, and wherein the remaining nut component is separated therefrom.
Figure 4:
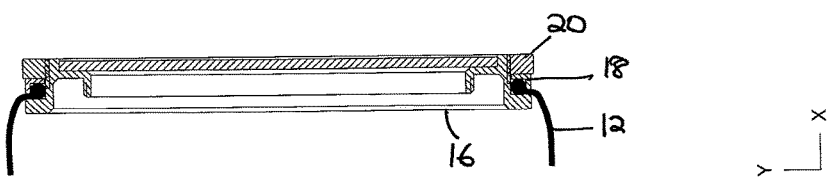
FIG. 4 is a side view of a seal assembly for use with a cover of the invention, showing all of the components in the connected position with the cover sealingly captures by the seal assembly.

FIG. 3 of the drawings illustrates the step of placing the washer 18 on the base 16. The washer ring side wall 18 and the washer ring top all 74 cover the cover O-ring from the side and from the top respectively, and seal the cover O-ring in the channel so defined. In FIG. 4 of the drawings, the nut 20 is attached, with the nut thread 84 engaging the thread portion 50 of the base 16. The nut 20 as it is tightened on to the base 16 pushes down on the washer 18, which incrementally squeezes the cover O-ring 28 into an effective sealed position. Further, it will be seen that the washer ring side wall 74 is pressed against the cover portion 12 at its location just adjacent the cover O-ring 28. The seal thus created when the nut 20 is fully threaded on to the base 16 is very effective, and establishes a watertight and an airtight connection between the cover portion 12 and the seal assembly 14.

In those applications of the invention where the cover and seal assembly 10 is utilized on a camera having a lens with filter threads, the base 16 can be attached to the lens of the camera by means of the inner wall 62, wherein the lens thread 64 engages the thread typically used for a filter on the camera lens, becoming one and subsequently moving and adjusting as one with the lens automatically. In this way, the seal assembly with attached cover can be fixed in position relative to the camera and camera lens to ensure that the glass 58 is always optimally positioned and that no image quality issues are encountered due to shifting of the cover relative to the lens. Many cameras behave in the manner above for optimal results. But even the phones are designed to optimize (make the most) of the optical requirement while not attached. Its size, composition, and positioning accommodates multiple brands, makes and models of phones.

Figure 5:
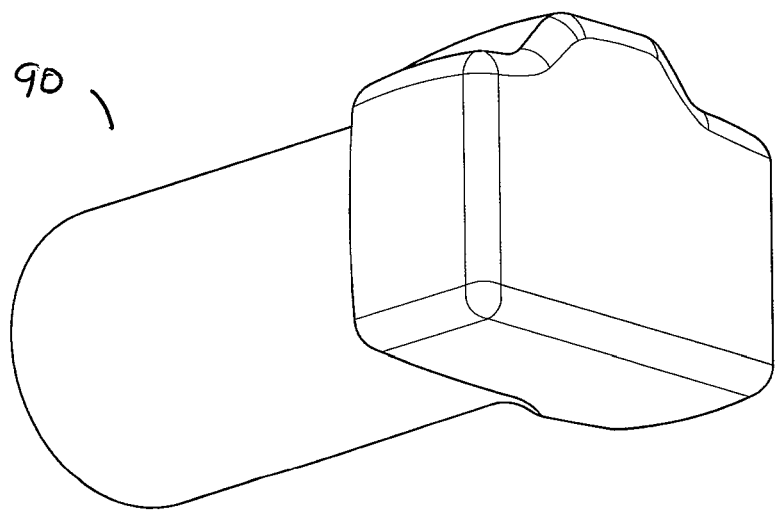
FIG. 5 is a bottom perspective view of a cover for a camera having an opening at the lens area through which the camera may be inserted and the opening can be sealed by the seal assembly.
Figure 6:
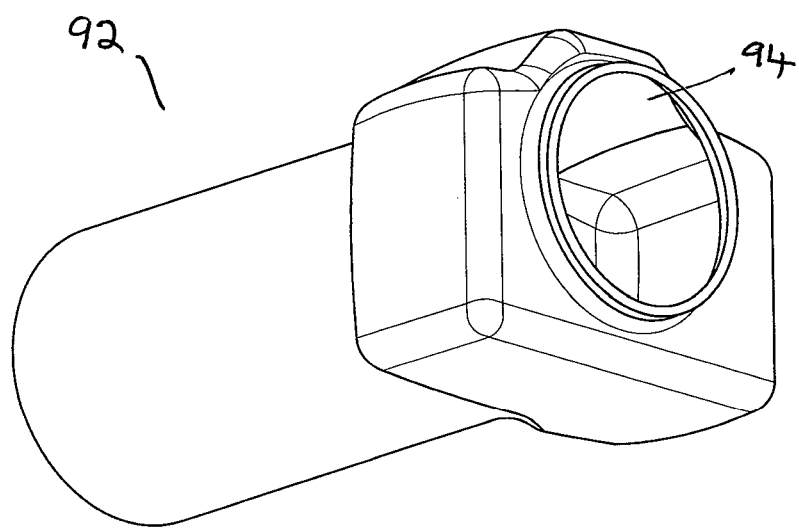
FIG. 6 is a bottom perspective view of a cover for a camera having an opening at the lens area and the rear area through which the camera may be inserted and the opening sealed by the seal assembly.

Referring to FIG. 5 of the drawings, there is shown a camera cover bag 90 of the invention. In this embodiment, the camera cover bag 90 will have an opening at the front thereof adjacent the camera lens, and the connection of the camera cover bag 90 to the camera is effected using the devices and steps as set out above. FIG. 6 of the drawings shows a camera cover bag 92 of the invention, and in this embodiment, there is a rear opening 94, which may be in addition to or in place of the opening at the front of the camera cover bag 90 as seen in FIG. 5. Note that the openings in the camera cover bags 90 and 92 can be stretched so as to be sufficiently large for proper insertion of the camera and its accessories, such as accessories to be installed in the bag. The opening thereafter resumes its original resting position size so that it can be used with a seal assembly to house the camera in the desired watertight and airtight condition. The cover material may be stretched many times without affecting its elasticity and its ability to return to the rest position without expanding over time and compromising its function.

Figure 7:
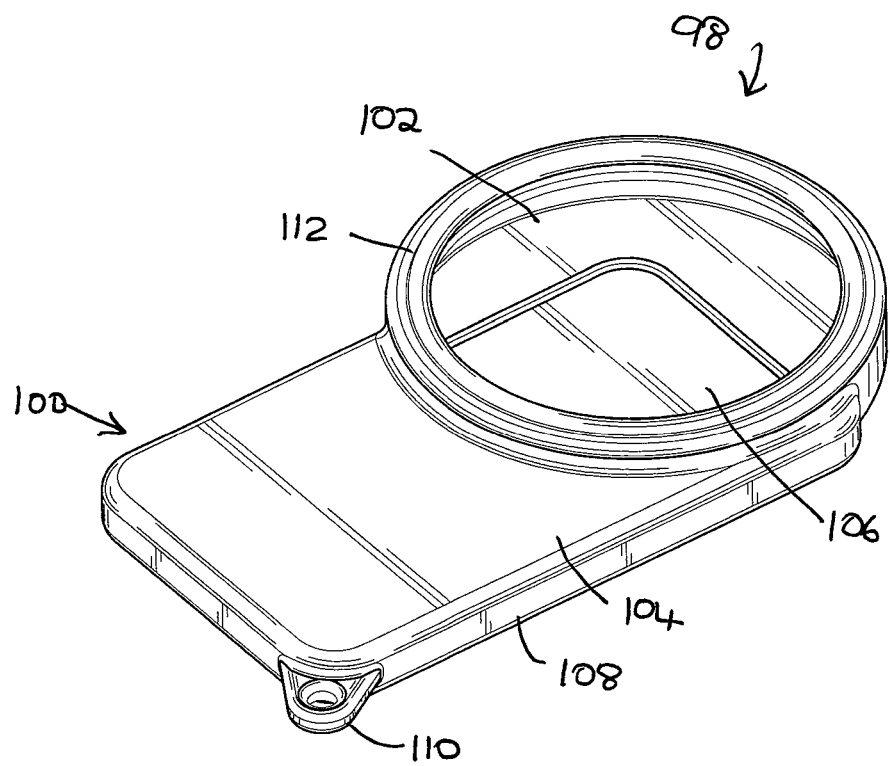
FIG. 7 is a perspective view of a cover of the invention for use with a smart phone of conventional shape.

FIG. 7 of the drawings illustrates in accordance with one aspect of the invention a phone cover bag 98, the phone typically having a camera built in for capturing images. This bag 98 may receive a phone or other device having the general shape of a phone or tablet or other electronic device and may therefore be used for any device that have such a shape. The phone cover bag 98 comprises a body portion 100 and a view opening portion 102. The body portion 100 has a front wall 104 and a rear wall 106, joined together by a side wall 108 extending around the perimeter of the cover bag 98. A holding tag 110 may be provided. In use, a phone or other device will be inserted through the opening portion 102 so that the display screen of the phone is adjacent the rear wall 106 and the lens(es) of the phone are located behind and adjacent the opening portion 102 of the cover bag 98. The cover bag 98 allows tactile feedback of all functions, operated by hard buttons, knobs, levers, wheels, as well as touch-sensitive screens. The cover enables touch-screen control.

The opening portion 102 has an edge which is in the form of a cover O-ring 112, and this O-ring 112 will coordinate with a seal assembly of the type described and illustrated in, for example, FIGS. 1 to 4 of the drawings so that the phone is housed within the cover bag 98 in an airtight and waterproof manner.

Figure 8:
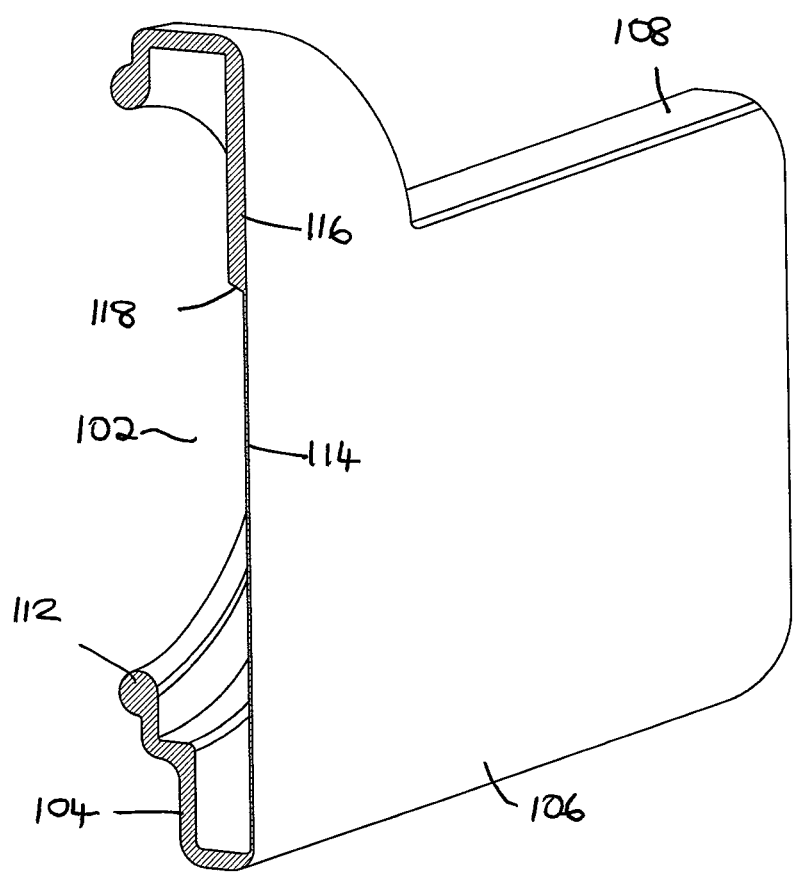
FIG. 8 is a rear and cutaway perspective view of a cover for a smart phone showing an opening through which the smart phone can be inserted into the cover.
Figure 9:
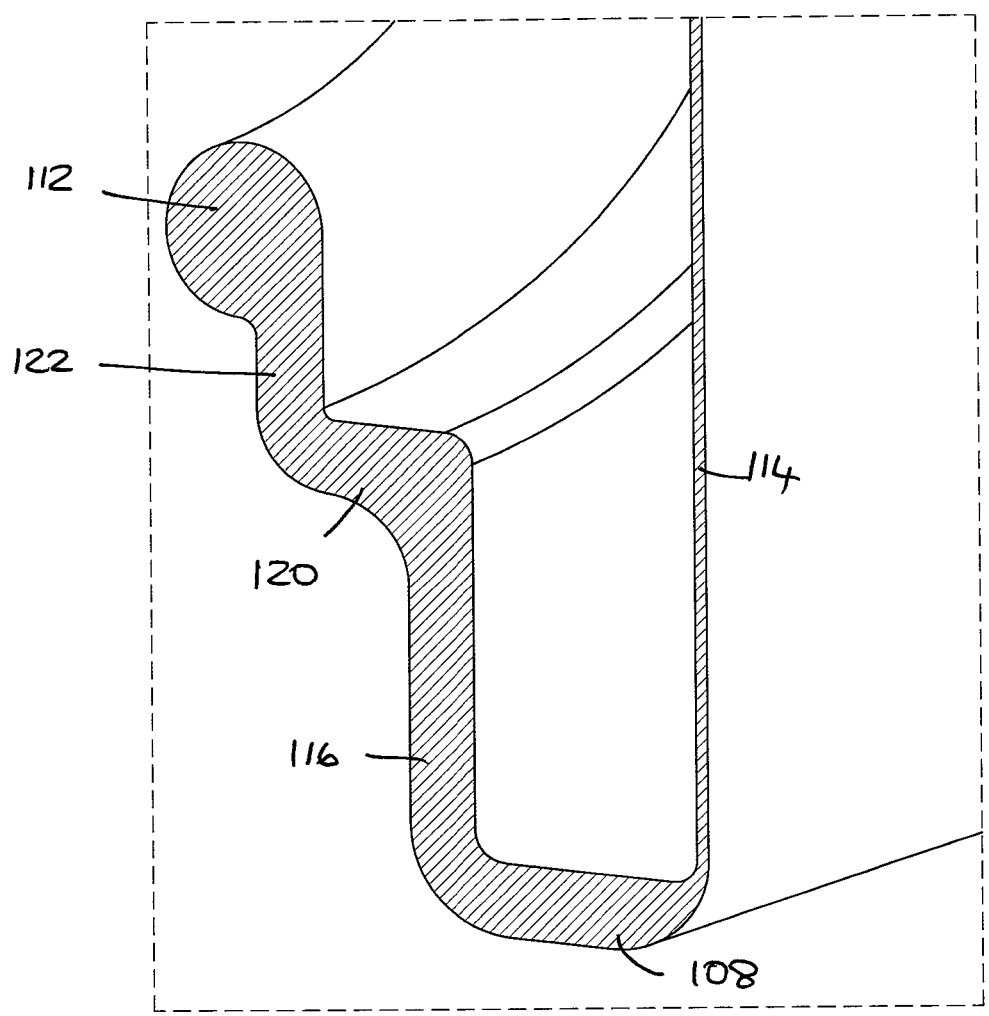
FIG. 9 is a detail cutaway view of the cover as shown in FIG. 8 of the drawings, showing the opening construction and the O-ring edge of the opening to facilitate engagement with the seal assembly.

FIG. 7, when viewed in conjunction with FIGS. 8 and 9, illustrate additional details and characteristics of the cover bag 98. The thickness of the front wall 104, rear wall 106 and the side wall 108 are carefully modulated according to the position of such walls in relation to the device (camera, phone, etc.) that will be housed within the cover bag 98. The front wall 104 may have a slightly greater thickness than that of the rear wall 106. As noted above, the rear wall 106 will be adjacent the phone screen when the phone is in the cover bag 98, and the rear wall 106 over at least a portion of its surface where it will be adjacent the screen will have the thinner dimensions so as to facilitate any tactile operations of the phone by touching the screen. The thinner portion 114 will extend over all or part of the phone screen, while a thicker portion 116 may be provided over the remaining areas of the phone or camera or device cover bag 98. Further, there is a transition area 118, where the thicker portion 116 of the wall transitions into the thinner portion 114 of the wall, a beneficial form of construction which makes the transition stronger and less prone to tearing or compromise. In addition to thickness, material composition can include differences in elasticity, viscosity, porousness, roughness to touch, and other characteristics.

The opening portion 102, as best seen in FIG. 9 of the drawings, has a ledge section 120 and a parallel section 122, the cover O-ring being connected to the parallel section 122. This may be of assistance in certain conditions in keeping the glass or plastic port of the seal assembly spaced from the lenses of the phone by just a small amount in order to provide more stability and optimal positioning of the phone within the cover bag 98.

A summary of potential benefits includes the following:
(1) Imaging performance.
(2) Unimpeded light/visibility/optical line of sight.
(3) Use of accessories with device's lens.
(4) Protects/prevents damage to the device.
(5) Optimizes seal thread uniformity+positioning.
(6) Increases compatibility with multiple devices.

Figure 10:
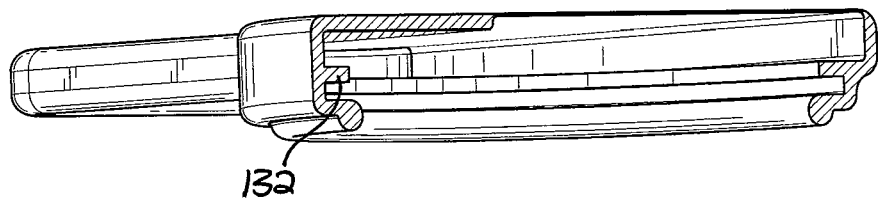
FIG. 10 is a first end perspective view, partially cutaway, of the cover seal as shown in FIG. 7 of the drawings.
Figure 11:
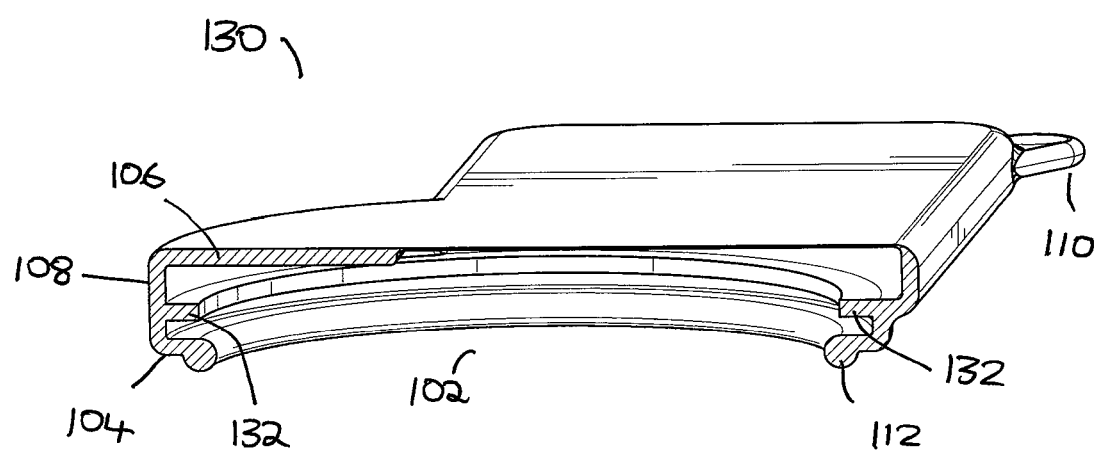
FIG. 11 is a second end perspective view, partially cutaway, of the cover seal as shown in FIG. 7 of the drawings.

FIGS. 10 and 11 show another embodiment of a phone cover bag 130 in most respects similar to the cover bag 98 in FIG. 7 of the drawings. In these figures, an intermediate inner lip 132 or shelf is shown which may serve the purpose of spacing the phone within the cover bag 130 relative to the cover bag 98, to facilitate additional stability of the phone within the cover and seal assembly. This may help to maximize operational control, and maintain stability and positioning and prevent movement.

Figure 12:
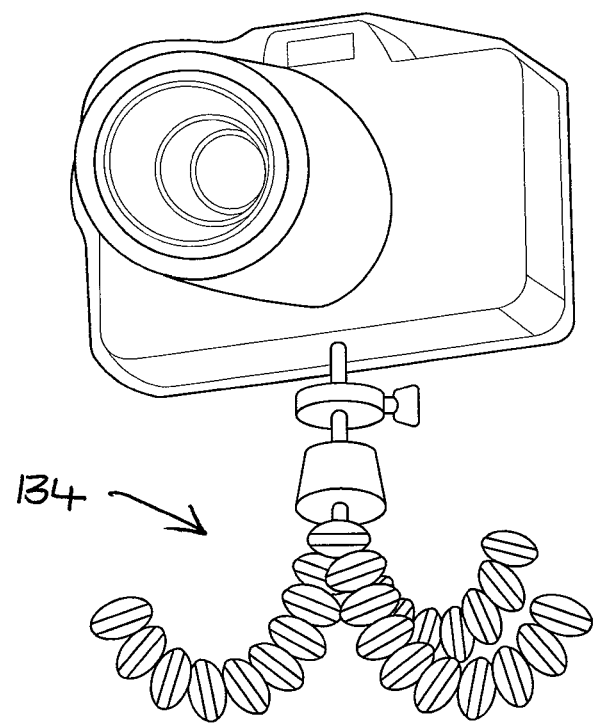
FIG. 12 of the drawings is a perspective view of a camera utilizing the cover and seal assembly of the invention and illustrating the presence of a tripod or camera support for the camera.
Figure 13B:
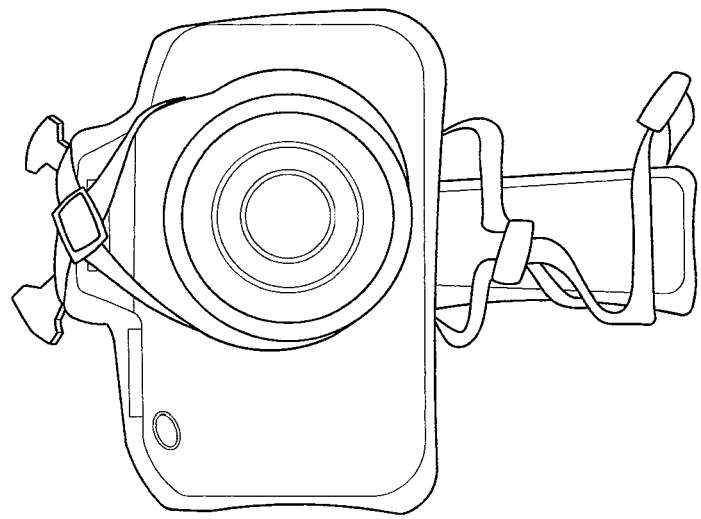
FIG. 13A and FIG. 13B show side and front views respectively of the cover and seal assembly housing a camera and including handle and strap portions.
Figure 13A:
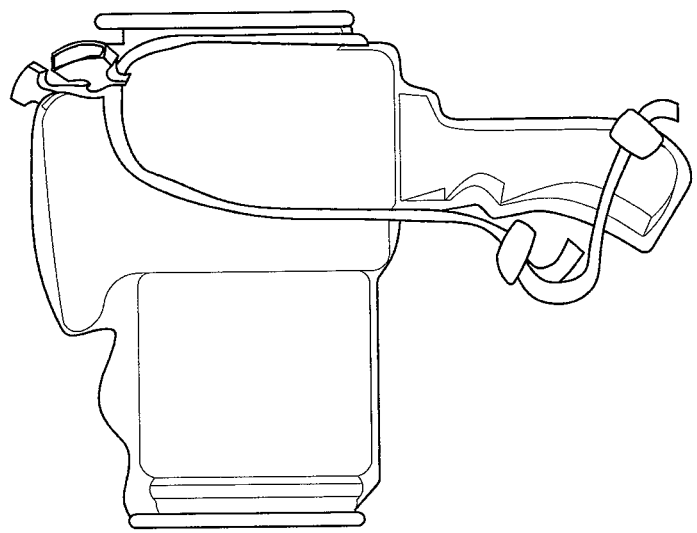
Figure 14:
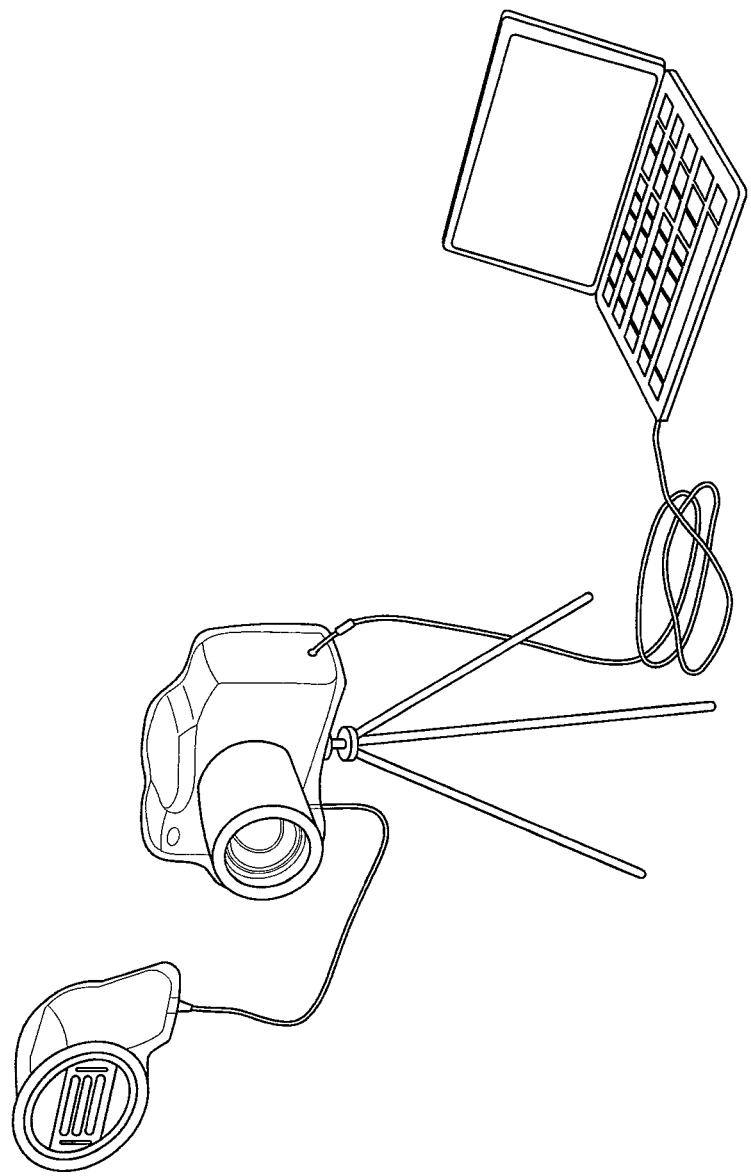
FIG. 14 shows a cover and seal assembly of the invention with a camera and its connectivity capability to a computer, flash and tripod.

FIG. 12 of the drawing illustrates the cover and bag assembly of the invention when used with a camera having a projecting lens, showing the feature of allowing the camera to be mounted to external apparatus, such as a tripod 134 through the cover portion while maintaining a water and air seal. FIGS. 13A and 13B show a side view and a rear view respectively of a camera in a cover and seal assembly, using a handle for operation. FIG. 14 of the drawings illustrates the capability to hook up a camera contained within the cover with a laptop computer, flash, as an example of accessories or supplemental devices which can be used with the invention and corresponding openings.

Figure 15:
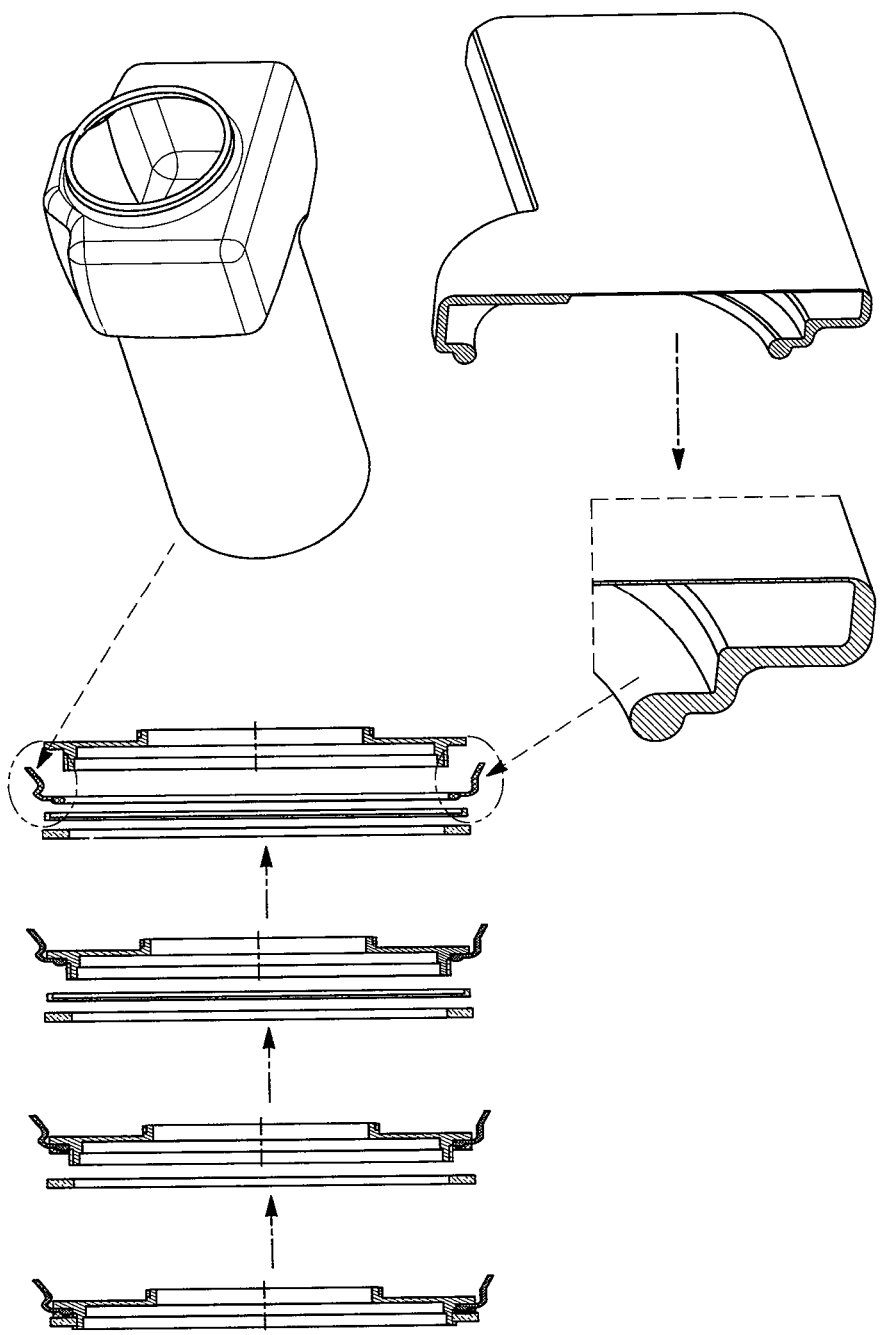
FIG. 15 shows a cover and seal assembly in accordance with an aspect of the invention and details of the cover in various formats to connect to a seal assembly configured to function with such various formats.

FIG. 15 of the drawings illustrates the capability of the cover and particularly the seal assembly to be of a one size configuration which is able to provide airtight housing for very differently shaped devices. This figure illustrated that one embodiment of the seal assembly can be used fasten the invention to a camera cover bag as well as a phone cover bag, giving it a universal application. This allows the owner of a cover and seal assembly to use the same article with a variety of electronic devices, reducing costs, so that it may be unnecessary to have multiple versions of the invention depending upon the platform and configuration of the device on which it will be used. This is an advantage of the invention which current waterproof covers do not offer and would be of considerable importance to a consumer who may use different cameras in the form of the traditional shape and phone shape. Various covers may be sold as part of the invention, but the high quality and well-constructed seal assembly having high level tolerances and effective connections would be usable on all of such covers which may be operated by a user.

Figure 16:
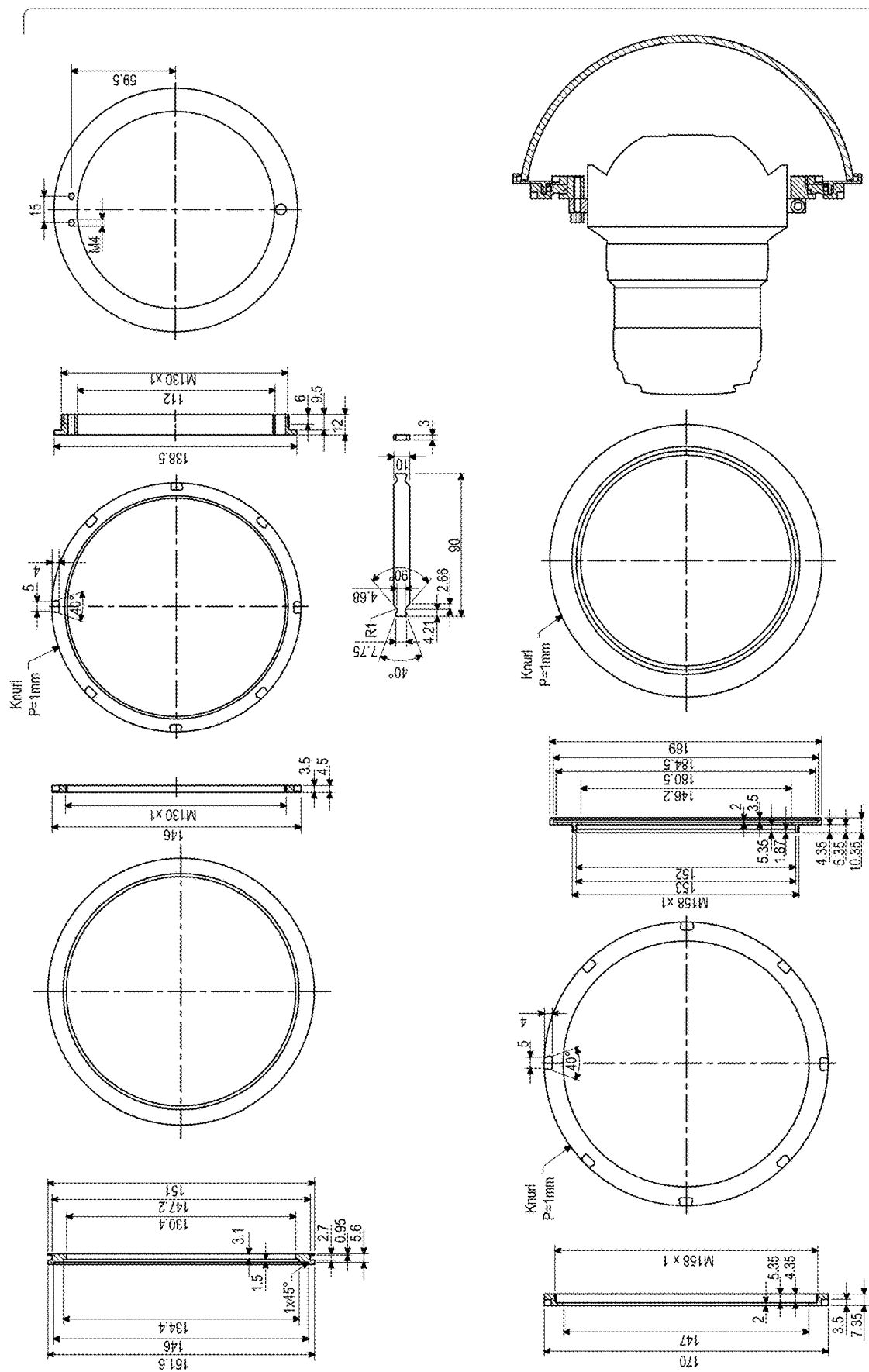
FIG. 16 are representations of a dome for attachment with the cover of the invention.
Figure 17:
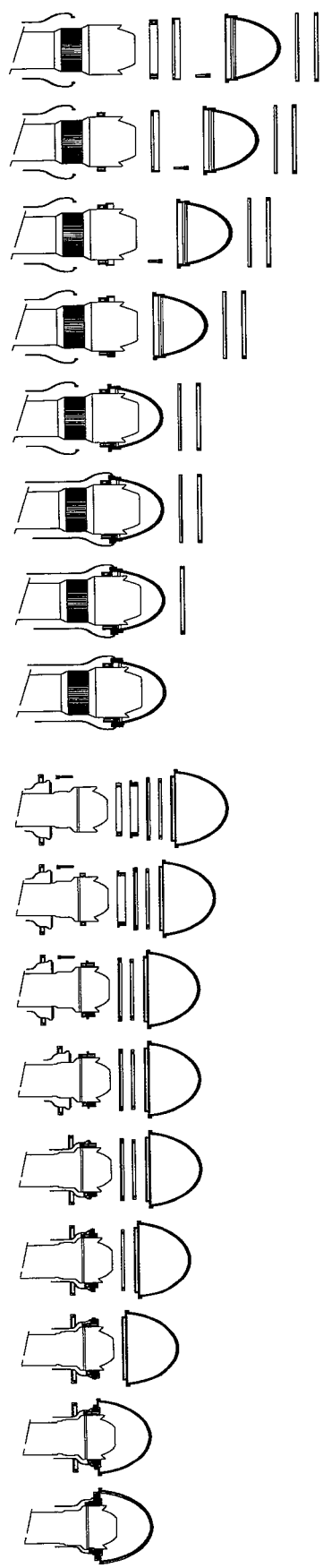
FIG. 17 is a representation of a series of figures showing steps and sequences for attachment of dome within the scope of the invention.

FIGS. 16 and 17 show various views of the dome component which may be used with the invention, as well as sequential steps for mounting a dome on the cover and camera using the features of the present invention. Dome Benefits may include the following:
(1) Wider field of view for wide-angle, 3D, fisheye, 180/360-degree lenses.
(2) Use of attached accessories within the dome, such as polarizers, filters, modifiers, zooms, etc.
(3) Underwater optical benefits that correct aberrations and reduce distortions caused by light traveling at different speeds over water versus air.

Figure 18:
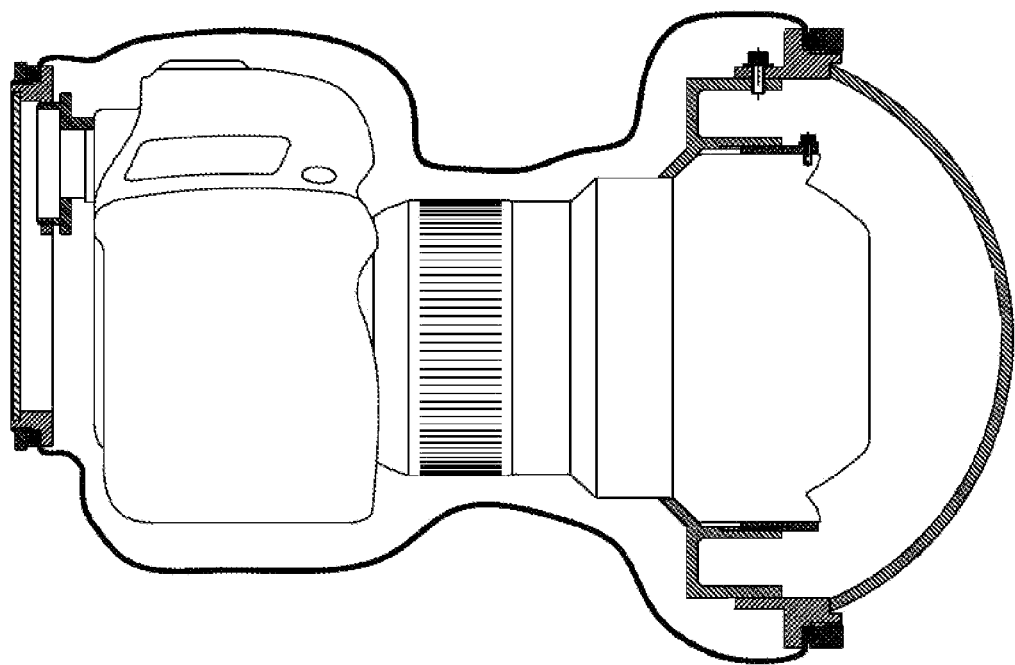
FIG. 18 is a side cutaway view of a camera in a cover and seal assembly of the invention and including a dome structure attachment as part of the seal and cover.
Figure 19:
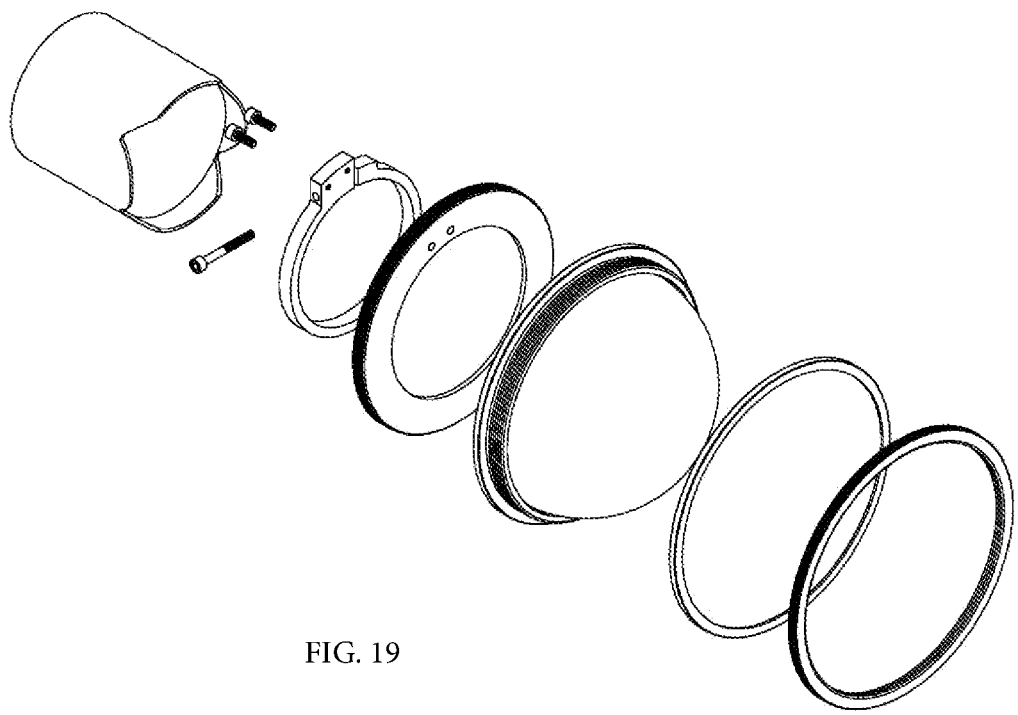
FIG. 19 is an exploded view of some of the components of the dome structure as shown in FIG. 18 of the drawings.

FIG. 18 of the drawings illustrates a camera contained within a cover seal in accordance with the invention. In this embodiment, the cover incorporates a dome instead of a flat glass or other lens. FIG. 19 of the drawings shows the attachment mechanism, which may be similar to that described above, but utilizing a dome structure in place of a flat glass structure.

Figure 20:
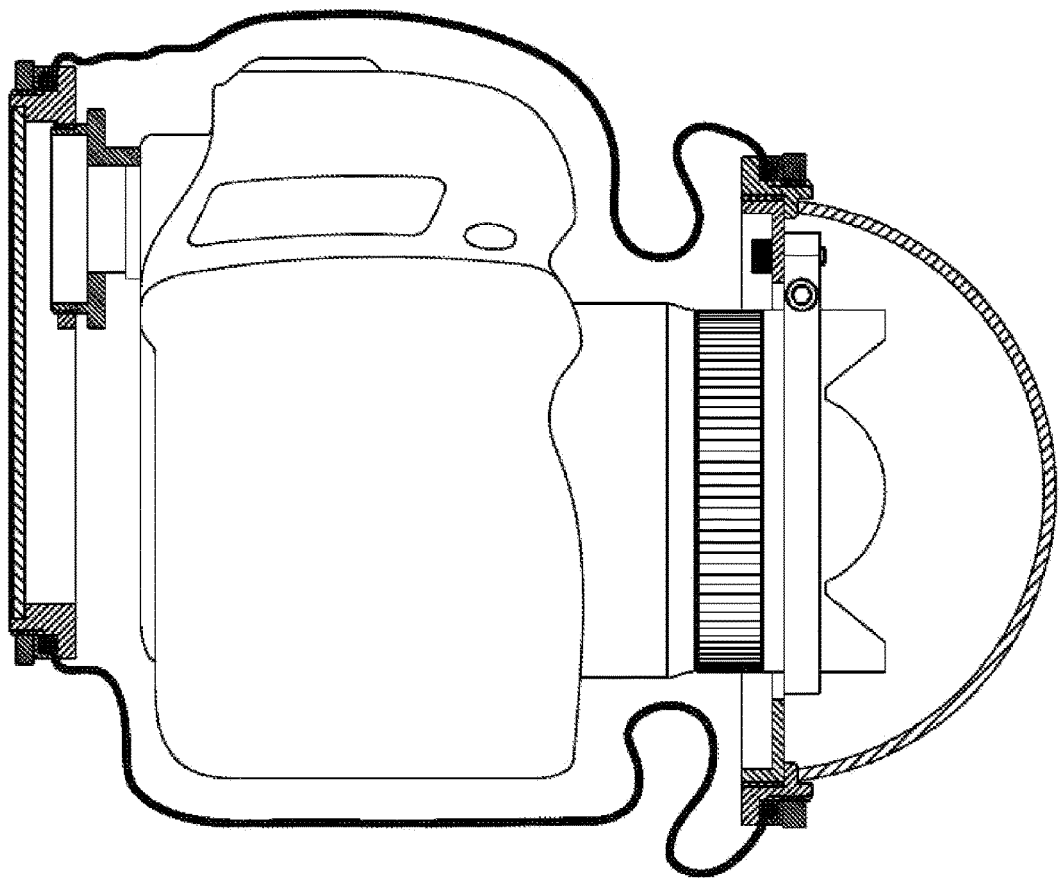
FIG. 20 is a side cutaway view of a camera in a cover and seal assembly in accordance with another embodiment of the invention, and including the dome structure attachment.
Figure 21:
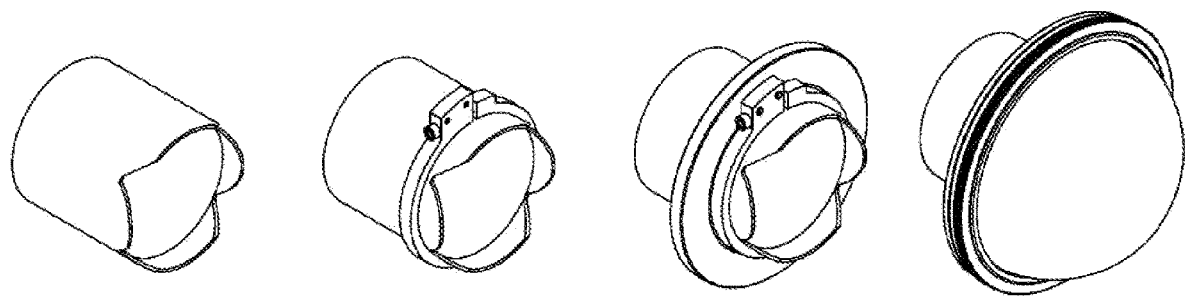
FIG. 21 shows views of the cover and seal assembly and dome structure illustrating a series of sequential assembly steps for these components.

FIG. 20 of the drawings illustrates a further embodiment of the invention, also utilizing a dome structure instead of a flat glass structure, while FIG. 20 illustrates sequentially the steps that may be needed for fastening the various components together and onto the seal cover to effect the water and airtight connection.

Figure 22:
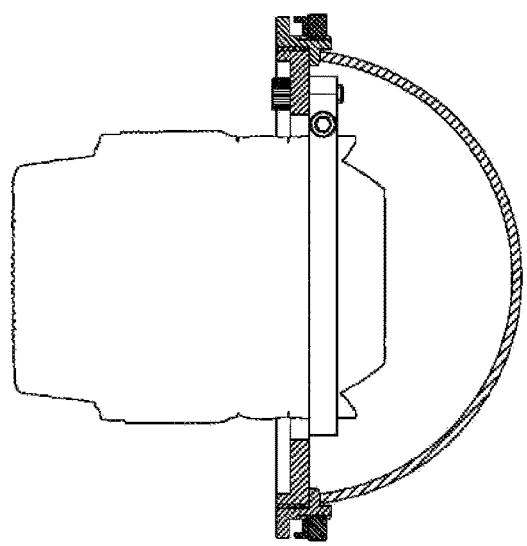
FIG. 22 is a side view showing a different dome mounting structure with the cover and seal assembly.
Figure 23:
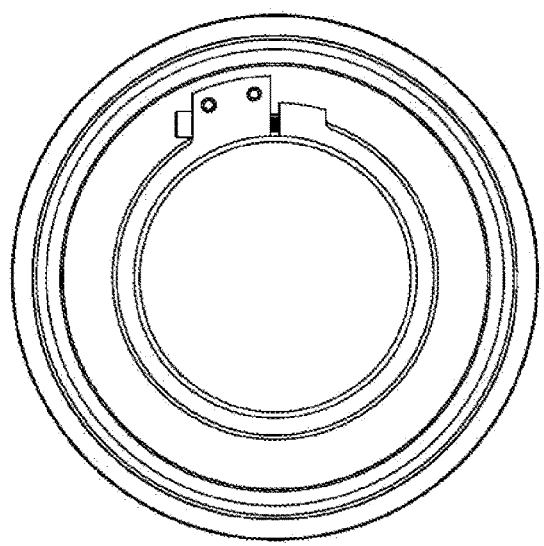
FIG. 23 is a front view of the dome mounting and cover and seal assembly as shown in FIG. 22 of the drawings.

FIG. 22 shows yet a further dome structure in side view, while FIG. 23 is a front view of the arrangement as shown in FIG. 22 of the drawings.

Further Features and Characteristics of the Invention

The invention preferably provides a waterproofing seal mechanism (port) for image-capture for electronic devices. Various embodiments of the present invention use in combination several feature and components, some of which are as follows:
(a) An internal base with a threaded, guiding, "female version" structure for a cover, as per (b) below.
(b) A soft, malleable cover, containing an O-ring or an edge that functions as a "male" version or portion of the seal cover.
(c) An angled or shaped washer that is designed to maximize the surface area and function as the "female" (base) portion of the seal to contact the "male" portion cover, without creating friction or damage to the washer, and providing tactile feedback to the user.
(d) An external nut having threading, which squeezes (b) and (c) together a without creating friction or damage to either of these parts.

The design has been developed in several ways, which add function, versatility and form to the invention. Some of these can be summarized as follows:
(a) The dimensions of the hard surfaces have been calculated and manufactured to optimize the seal and ease of use. Tolerances, dimensions, lengths of threads, and surface characteristics have been modified and assessed to better match the soft materials (covers), and facilitate installation and use.

(b) The glass element is now located toward the extreme front, to the extent possible, in order to eliminate outer edges and increase visibility.

(c) The lens-mounting threads are situated inside the base area rather than protruding from the back, in order to reduce distance from the glass and to optimize visibility.

(d) The threading components are designed to allow the invention to mount onto, and "become one" with the lens of a camera, ensuring that the invention moves in every way the lens of the camera moves.

The user can, in fastening the device on to a camera, apply gradual threading pressure as needed to control the gradation or intensity of the waterproof seal. In other words, the user controls the waterproofness in accordance with preferred use; a tighter seal can be effected when the situation demands that increased level of waterproofing is needed. The design of the invention also provides both visual and tactile feedback to the user as the tightening is applied, increasing the user's seal ease, efficacy, and correctness.

The same system is used for almost all of the seals (openings in combination with our covers), including the cable adaptor/tethering seal, the tripod adaptor, all of the optical glass ports, rear glass, domes, and for new phone products.

Some of the unique and advantageous features of the invention include the following:

(a) Specific lengths and dimensions of metal components.

(b) The composition of metal components.

(c) The composition of soft components (cover).

(d) The thickness and/or diameter of soft component O-ring to optimize surface area.

(e) The shore durometer (rigidity and flexibility parameters and characteristics) of the soft component, including measurements for solidity, elasticity, and resistance to indentation.

The camera cover comprised of silicone material may preferably be: medical grade, to avoid human allergies, irritation, and the like; clear and/or translucid; about 25-40 shore durometer (rigidity); with a thickness of about 1.5 mm, and thickness ranges which may be between 0.5 mm and 3 mm.

Phone covers comprised of silicone material may preferably include: medical grade to avoid human allergies, irritation, and the like; clear and/or translucid; about 25-40 shore durometer (rigidity), with possible durometers of about 25 or 50 shore, or within this range, and a combination of ranges; with a thickness range of about 3 mm for the phone body covering portion of the cover, and about 0.6 mm for the phone LCD screen covering portion of the cover.

The phone cover design may isolate and secure the optical component (port) within a ridge that maintains the desired relative positions and prevents or reduces movement. Maintaining the desired position is important for the optical/camera/lens integrity, since it helps to ensure that the port does not interfere with line of sight and thus optimizes the imaging. Preventing movement is also important to help stop the port from hitting or banging or otherwise damaging the internal device (phone or camera) as the user moves around. In other words, unlike the cover cameras, which may rely on connection to the lens, as described above, the phone cover handles securing the port position with the cover itself, while at the same time being able to accommodate multiple brands, makes, models of phones and other devices.

The dome benefits also apply to the phone.

For all covers, gradual transitions in wall thickness occurs where thickness variations or changes occur. This gradual transition process increases durability by reducing tearing and breaks when stretched during installation of devices and accessories, transport, and use.

The composition and materials which make up the cover and seal assembly are engineered to allow electromagnetic conductivity so that human commands onto the LCD screens and other electronic surfaces inside the cover can accurately and faithfully receive and accept commands from the outside through the material.

Optics: Optical grade glass offers high refractive indices, and low dispersion. The invention uses optical grade, high purity glass or plastic or acrylic to maintain precision. The thickness range of the glass may typically be about 2-4 mm. The glass is capable of treatments such as tempering, nanocoating, and different ports may be treated for multiple/different purposes, including: water phobia, oleophobic and shock/break resistance.

Where a dome is used with the invention, the ports may also use variable geometry to optimize the optical accuracy, such as by reducing any light aberrations. In other words, they are of various thicknesses and of hemispheric cuts depending on the need and circumstances of use.

In one embodiment, the covers have a single opening through which the device is inserted or removed. There may be multiple openings in other embodiments. The one-opening covers may have varied composition, durometric characteristics, rigidity, thickness, and transparency. The soft, malleable covers that work in conjunction with the above waterproof seal have certain beneficial features, including the following:

(a) Transparency allows user to see through the cover at least at relevant points for visual and tactile control and operation. The aforementioned materials are preferably engineered to allow electromagnetic conductivity through them so that human commands onto LCD screens and other electronic surfaces inside the cover can receive and accept commands from the outside through the material, preferably with a high degree of accuracy and further without any substantial loss of sensitivity.

(b) Improved tactile composition optimizes use in various environmental conditions, from desert environments with temperatures above 100 F to near freezing underwater use (36 F) below ice.

(c) Manufacturing design that comports varied, different thicknesses, durometer, rigidity, transparency, and porousness for tactile control within the same cover. The same cover having varied composition and design manufacturing processes is important, because different parts of the cover play different roles when it comes to control, resistance to the elements, durability, transparency, tactile dexterity, and electromagnetism that allows devices inside the control to receive external human stimuli such as LCD screen controls and application functionality.

The processes utilized in the manufacture of the invention may be such that they result in the ability to control and vary the composition of the malleable materials to modulate stiffness, porosity, ruggedness, thickness, transparency, electro-magnetic conductivity, elasticity, durability, and the feel of the enclosure bag. The processes are such as to allow variance within a bag or enclosure so that different parts of the material have a different composition for the desired benefit. For example, structural walls may be reinforced where the user may be handling the gear with some force, while designing other walls to maintain electro-magnetic conductivity for touchscreen or other more subtle or lighter forms of functional and operational control.

Universal Rear Glass Port: Given the number of image-capturing devices and the frequency with which manufacturers introduce variations, modifications, and new designs, the invention may incorporate a universal, tripod-mounted mechanism that is both adjustable and maintains control access around, behind and inside it. The sealing port mounts onto varying brackets that can be adjusted based on the distance desired from the back of the electronic device, and the device may slide from side-to-side to accommodate sighting such as LCD screens and/or viewfinders. The mounting screw attaches to the bracket of the device, while also allowing the bracket to pivot, so that in addition to side to side movement capability, the rear glass and port can also pivot back and forth for greater flexibility of use and access to the device's operational controls.

Universal, modular ports for image-capture: There are thousands of camera lenses in the market, and dozens of new ones are introduced every year. Waterproof housings that do not conform to each lens can have a negative impact on the optical quality of the captured image, especially as most lenses have moving controls and parts that alter its focal length, viewing angle, depth of field, etc. By not conforming to the lens variations, accessories such as waterproof housings can interfere with viewing angle (such as by vignetting), focus, or clarity of the image. The present invention is both modular, universal, and conforms to nearly every lens so that it mounts to the lens at the optimal optical distance and position, as well as moving in conjunction with the lens to maintain and preserve that optimal optical position in all user variations, such as focal length (zooming in and out), focus, and viewing angle.

One embodiment of the invention comprises a universal, modular benefit of the dome design, which uses clamps and adaptors, so it is both universal/one-size-fits-all, and lens-specific because of the clamps and adaptors that customize it.

Modular manufacturing process: The present invention discloses devices and components which have a modular design that allows for accessory appendages to be connected to the "base" product, as may be needed to support incremental functionality, such as:

Lighting (Flash, Tethering, Triggers, etc.)
Mounting (Tripod, Monopod, Stabilizers, etc.)
Connecting (Power, Data, Control, etc.)
Stabilizing (Gimbal, Pistol Grip, etc.)
Extensions (Zoom lenses, Battery Grip, Motors, External HDD, other devices)

The base design has access and connection points as part of the design that enables a vulcanized appendage to attach and connect, thereby extending the functional capability, space, and utility of the base enclosure.

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

The invention claimed is:

1. A cover and seal assembly for an electronic device, the assembly comprising:
   a cover defining a space and having an opening therein with a peripheral edge through which the electronic device can be inserted or removed;
   a seal assembly for sealing the opening, the seal assembly comprising:
   a base portion having a circular side wall with a top edge and bottom edge, an outer peripheral flange on the side wall for receiving the peripheral edge of the cover, an inner glass support shelf on the side wall near the top edge of the circular wall, a lens fastened to and supported on the inner glass support shelf, and a depending wall extending downwardly from the inner glass support shelf having a lower edge which is between the top edge and bottom edge of the base portion;
   a washer mounted on the outer peripheral flange for capturing the peripheral edge of the cover therebetween; and
   a nut threadedly connected to the circular side wall for maintaining the washer in a secured position on the outer peripheral flange.

2. The cover and seal assembly as claimed in claim 1 wherein the depending wall has external threads adapted to fasten to an electronic device in the form of a lens of a camera.

3. The cover and seal assembly as claimed in claim 1 wherein the peripheral edge of the cover comprises an O-ring configuration.

4. The cover and seal assembly as claimed in claim 1 wherein the seal assembly is configured to sealingly accommodate electronic device accessories selected from one or more of: tripod, flash, computer, tablet, straps, dome cover.

5. The cover and seal assembly as claimed in claim 1 wherein the cover space is shaped and dimensioned to receive a camera with attached lens.

6. The cover and seal assembly as claimed in claim 1 wherein the cover space is shaped and dimensioned to receive a smartphone.

7. The cover and seal assembly as claimed in claim 6 wherein the cover has a rear side comprising the opening which is positioned to register with a lens on the smartphone and a flat rear wall, and a front side comprising a flat front wall which covers a screen of the smartphone, wherein at least a portion of the flat front flat wall has a thickness configured to facilitate operation of the smartphone by tapping the screen through the front flat wall on the screen.

8. The cover and seal assembly as claimed in claim 7 wherein the flat rear wall has a length and a width, and the opening extends across at least the entire width of the flat rear wall so that the lens and surrounding portion of the smartphone will be covered only by the opening with the seal assembly thereon.

9. The cover and seal assembly as claimed in claim 8 wherein a portion of the opening extends beyond the width of the flat rear wall.

10. The cover and seal assembly as claimed in claim 8 wherein the flat front wall of the cover has a first thickness over non-screen portions of the smartphone, a second lesser thickness over at least a part of the screen portions of the smartphone, and a transition thickness step between the first thickness and the second lesser thickness of the cover.

11. The cover and seal assembly as claimed in claim 1 wherein the cover is comprised of a malleable and stretchable silicone material.

12. A cover and seal assembly for a smartphone with a touchscreen, the assembly comprising:
  a cover defining a space and having an opening therein with a peripheral edge through which the smartphone can be inserted and removed, the cover having a first thickness over at least the portion thereof which covers other than the touchscreen of the smartphone and a second lesser thickness over at least the portion thereof which covers the touchscreen of the smartphone;
  a seal assembly for sealing the opening, the seal assembly comprising:
  a base portion having a circular side wall with a top edge and bottom edge, an outer peripheral flange on the side wall for receiving the peripheral edge of the cover, an inner glass support shelf on the side wall near the top edge of the circular wall, and a lens fastened to and supported on the inner glass support shelf;
  a washer mounted on the outer peripheral flange for capturing the peripheral edge of the cover therebetween;
  a nut threadedly connected to the circular side wall for maintaining the washer in a fixed position on the outer peripheral flange.

13. The cover and seal assembly as claimed in claim 12 wherein the cover has a rear side comprising the opening which is positioned to register with a lens on the smartphone and a flat rear wall, and a front side comprising a flat front wall which covers the screen of the smartphone, wherein at the least a portion of the flat front flat wall has a thickness configured to facilitate operation of the smartphone by tapping the touchscreen through the front flat wall of the cover.

14. The cover and seal assembly as claimed in claim 13 wherein the flat rear wall has a length and a width, and the opening extends across at least the entire width of the flat rear wall so that the lens and surrounding portion of the smartphone will be covered only by the opening and the seal assembly attached thereto.

15. The cover and seal assembly as claimed in claim 14 wherein a portion of the opening extends beyond the width of the flat front wall.

16. The cover and seal assembly as claimed in claim 13 wherein the flat front wall of the cover has a first thickness over non-touchscreen portions of the smartphone, a second lesser thickness over touchscreen portions of the smartphone, and a transition thickness step between the first thickness and the second lesser thickness of the cover.

17. The cover and seal assembly as claimed in claim 12 wherein the cover is comprised of a malleable and stretchable silicone material.

18. The cover and seal assembly as claimed in claim 12 wherein the space in the cover comprises a flange wall to secure the position of the smartphone and hold the smartphone within the space, and reduce movement thereof.

\* \* \* \* \*